United States Patent [19]

Hug

[11] Patent Number: 5,180,922
[45] Date of Patent: Jan. 19, 1993

[54] DISTANCE MEASURING APPARATUS WITH PHASE DETECTION

[75] Inventor: Gottfried Hug, Waldkirch, Fed. Rep. of Germany

[73] Assignee: Erwin Sick GmbH Optik-Elektronik, Waldkirch, Fed. Rep. of Germany

[21] Appl. No.: 643,862

[22] Filed: Jan. 22, 1991

[30] Foreign Application Priority Data

Jan. 26, 1990 [DE] Fed. Rep. of Germany ....... 4002356

[51] Int. Cl.⁵ .................... G01N 21/86; G01C 3/08
[52] U.S. Cl. ................................ 250/561; 356/5
[58] Field of Search ........... 356/5, 4; 250/561, 201.4, 250/201.2

[56] References Cited

U.S. PATENT DOCUMENTS

| | | | |
|---|---|---|---|
| 3,326,078 | 6/1967 | Clarke et al. ........................... | 356/5 |
| 4,403,857 | 9/1983 | Holscher ............................... | 356/5 |
| 4,531,833 | 7/1985 | Ohtomo ................................. | 356/5 |
| 4,895,441 | 1/1990 | Allen, Jr. ............................. | 356/5 |
| 5,054,911 | 10/1991 | Ohishi et al. ........................ | 356/5 |

*Primary Examiner*—David C. Nelms
*Assistant Examiner*—Michael Messinger
*Attorney, Agent, or Firm*—Townsend and Townsend

[57] ABSTRACT

A distance measuring apparatus has a photoelectric light transmitter (11) and a photoelectric light receiver (12) which alternately direct light via a measurement path (14) and a reference path (15) to a single photoreceiver (20). The distance from a target (13) is determined by measurement of the transit time differences via the measurement path (14), on the one hand, and via the reference path (15), on the other hand. The light transmitter (11) contains two laser diodes (18, 19) which can be electronically switched in a complementary manner of which the one sends the light trains to the measurement path (14) and the other sends light trains to the reference path (15). Both light wave trains are alternately received by the same photoreceiver (20) which is connected to an electronic processing circuit.

13 Claims, 3 Drawing Sheets

DISTANCE MEASURING APPARATUS WITH PHASE DETECTION

BACKGROUND OF THE INVENTION

The invention relates to a distance measuring apparatus comprising a photoelectric light receiver and a photoelectric light transmitter which is preferably arranged alongside the photoelectric light receiver, which alternately transmits high frequency modulated light wave trains to the light receiver via a measurement path and a reflective target arranged at its end, wherein the distance of the target from the light transmitter/light receiver is to be measured, and via a reference path of known length provided between the light transmitter and the light receiver, preferably within the housing; and also an electronic evaluation circuit which preferably contains a microprocessor and which evaluates the light wave trains which are alternately received by the light receiver with respect to the difference of the transit time via the measurement path, on the one hand, and the transit time via the reference path, on the other hand, and which deduces from this the spacing of the light transmitter/light receiver from the target, taking account of the speed of light and the known length of the reference path.

Such pieces of distance measuring apparatus (DE-OS 34 29 062) serve, for example, to measure by electronic means distances which lie in a range from 2 to 10 m from the distance measuring apparatus, with the measurement accuracy lying in the range of a few mm. In this way the filling levels of containers and also for example the degree of filling of shelves can be detected from a technological measuring viewpoint and transmitted to a central station by an electronic route.

Such distance measuring apparatus normally use a measurement receiver and a reference receiver which involves the danger of differential drifting of the two receiver circuits and leads moreover to disadvantageous effects of different depletion layer capacities or reaction time changes of the two photodiodes used for reception. On the other hand, the use of only one light transmitting diode brings the problem that cross-talk between the measurement and reference paths cannot be precluded.

SUMMARY OF THE INVENTION

The object of the present invention is to provide a distance measuring apparatus of the initially named kind in which the receiving circuit is insensitive to drift, in which the signal to noise ratio is improved and in which an extremely high cross-talk damping from the measurement and reference channels is possible, with the measurement and reference paths being selectable largely independently on the location of their start.

In order to satisfy this object the invention provides that the light transmitter contains two optoelectronic light transmitter elements, in particular semiconductor light transmitter elements and preferably laser diodes, which can be switched electronically in a complementary manner, of which the one light transmitter element transmits the light wave trains via the measurement path and the other transmits the light wave trains via the reference path; and in that the light receiver contains an optoelectronic light receiving element, in particular a light receiving semiconductor element, preferably a photodiode element which is connected to the electronic processing circuit and which receives both the light wave trains from the measurement path and also the light wave trains from the reference path.

Particular preference is given to an arrangement which is characterised in that the light wave trains have a wavelength of the order of magnitude of the distance to be measured, and in that the electronic evaluation circuit measures the phase difference of the modulation of the light wave trains which have passed along the measurement path and the light wave trains which have passed along the reference path.

Thus, in accordance with the invention, two laser diodes which can be switched in a complementary manner are used on the transmitter side for the measurement and reference channel, whereas only a single photodiode element is provided at the receiver side. In this way the following advantages are achieved in comparison to a solution with two receivers (measurement and reference receivers) or with one electrical reference path.

The receiver circuit is intensitive to drift; depletion layer capacity or reaction time changes of the photodiode used in the receiver are detected by the reference path.

A simple operation with Avalanche photodiodes is possible; a temperature-dependent follow-up control of the voltage causes parameter changes of the relevant photodiodes which are however detected by the reference path. In accordance with the invention only one Avalanche photodiode is necessary.

The signal-to-noise ratio is improved, the photodiode capacity can be bound in accordance with the invention into an oscillating circuit of high q-factor while the real part (transimpedance resistance) is increased with a simultaneously high operating frequency. A phase drift is detected from the reference path.

The attainment of an extremely high cross-talk damping between the measurement and reference channels is possible; the respectively switched-off laser can transmit no optical signal, as a result of the circuit, in particular when it is subjected to a negative potential in such a way that the negative potential is applied in a depletion direction of the respectively switched-off laser diode. The cross-talk damping is only determined by the optical separation between the measurement and transition paths and/or by the electromagnetic coupling in of the transmitter into the receiver device.

A simple realization of an optical collimation system for the measurement channel is possible in this way, no beam splitting is required for a reference path. The reference path is determined by the space between the reference laser diode and the receiver photodiode.

The switch-over of the semiconductors can be simplified in accordance with the invention, no high requirements are placed on the semiconductor switches with reference to stop band attenuation. The transit time differences of the switching element can be kept very small by a good adaptation of the parasitic parameters such as series resistance and depletion capacity through the use of a double diode. The change-over can take place with high levels which is of advantage for technical reasons associated with disturbance.

A small transit time drift is obtained; common modulation paths can be used for the measurement and reference channel up to diode change-over. Through the high modulation bandwidth of the measurement and reference lasers (1 GHz) and comparable operating conditions (temperature, working point) the resulting transit time differences can be made negligibly small. The two laser diodes can be arranged spatially in such a way that an ideal light guidance is achieved on the measurement and reference paths. Both light paths can be supplied in this manner with high light energy, whereby external disturbing influences are minimised.

An advantageous embodiment of the invention is characterised in that the laser diodes can be connected via auxiliary switches which can be switched in complementary manner to a DC feed voltage and can be connected to the high frequency modulation voltage via high frequency switches which can be switched in a complementary manner, preferably in synchrony with the auxiliary switches. In this arrangement the auxiliary switches are inserted into the positive feedlines to the laser diodes and the high frequency switches are inserted into the negative feedlines to the laser diodes.

The particularly good blocking of the laser diode which is inactive at a particular time can be further improved in this way and by applying a preferably negative potential in the depletion direction to the laser diode which is respectively switched off. It is also advantageous if the positive terminal of each laser diode is connected to a preferably negative DC blocking potential via a resistance which is of a higher order of magnitude than the resistance value of the through switched laser diode.

Moreover, the positive terminal of each laser diode is preferably connected to the positive feed voltage via a respective transistor which forms the auxiliary switch.

This latter embodiment also favors the switching and regulation of the laser diodes. In this respect the transistor is preferably energised both by a switching signal and also by a regulating signal for the maintenance of a predetermined light intensity and preferably also to regulate out degradations of the laser. Moreover, a transistor, the base of which is acted on by the switching signal and the collector of which is preferably acted on by the regulating signal is preferably connected in front of the combined switching regulating transistor.

Preferred embodiments for the high frequency circuit comprise the arrangement in accordance with claim 10 in which switching diodes which are poled in the same direction as the laser diodes are inserted into the negative feedline to the laser diodes as high frequency switches and are jointly connected via the inductor of a high pass filter energised by the high frequency modulation potential to the negative pole of the feed voltage or to earth. The connection point of each switching diode with the laser diode preferably lies at a negative potential when the laser diode is switched off. Moreover, high frequency decoupling capacitors are preferably inserted between the positive feedline to the laser diodes and the negative pole of the feed potential or earth.

The intensity of the laser diodes can be particularly expediently regulated by an arrangement in which a monitoring diode is associated with each laser diode and is preferably integrated therewith, with the monitoring diode preferably being connected via a diode poled in the same direction as the switching diodes to the input of a PI-regulator, which preferably regulates the laser diodes to a predetermined intensity value via the switching regulating transistors.

This embodiment is expediently further developed in such a way that a desired value signal which takes account of the degradation of the laser diodes, or which serves for the adjustment of the laser diode brightness, is also supplied to the PI regulator; and indeed in such a way that a special desired value signal is preferably provided for each laser diode.

The invention thus relates to an apparatus for the self-calibration of distance measuring devices in accordance with the transit time process.

In accordance with the invention an electronic switch-over, which is neutral from the point of view of the transit time, is provided between a measurement path and a reference path by two optoelectronic transmitters, preferably semiconductor laser diodes. Semiconductor switches, in particular switching diodes can be used for the change-over apparatus. If the respective diode is separated from the working current circuit then a switching diode simultaneously serves for decoupling from the modulation circuit with the corresponding high frequency information. In order to prevent any form of light emission with a modulation component in the switched out state an auxiliary potential is supplied to the laser in the depletion direction to the laser. The active switching process is initiated via two auxiliary switches, preferably transistor switches in the low frequency part of the regulation circuit. These can be used at the same time as setting elements of a PI regulator common to the two lasers. The regulating circuit is closed via a current summing circuit of the two monitoring diodes.

Thus, in accordance with the invention, the disadvantages which would arise by taking a reference through one reference receiver are avoided. The high modulation bandwidth of the laser diodes in conjunction with diode switches makes it possible to achieve good transit time constancy and thus a small offset drift of the self-calibration. By disposing with the one reference receiver the reference path can be made of a narrow bandwidth (selective) and thus so that it is insensitive to external disturbing influences or noise. The detectability can thereby be improved.

The invention will now be described in the following by way of example and with reference to the drawing in which are shown:

DETAILED DESCRIPTION OF THE PREFERRED EMBODIMENT OF THE INVENTION

Figure 1:
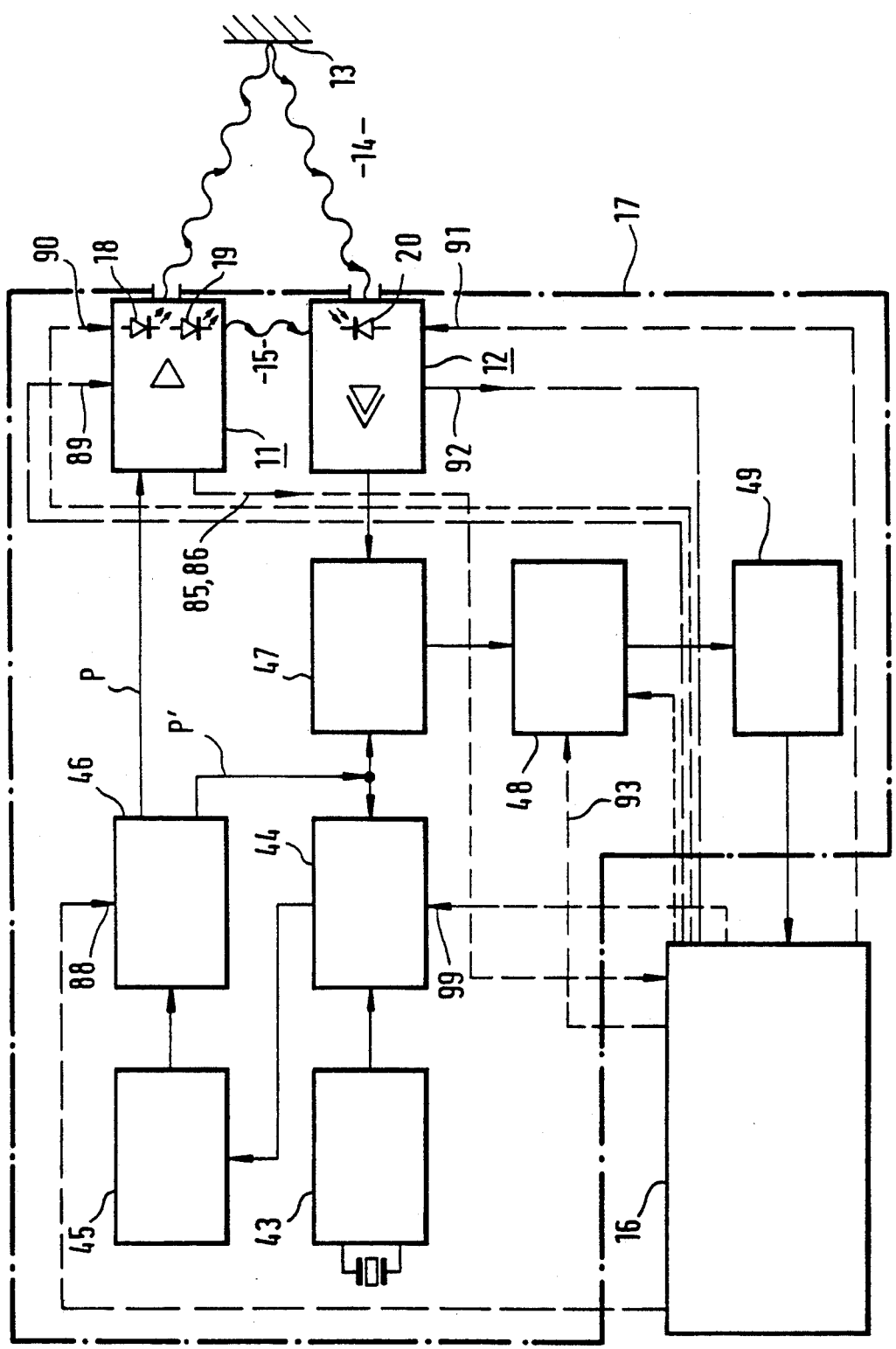
FIG. 1 an overall view of a distance measuring in the form of a block circuit diagram in accordance with the invention, FIG. 2 a somewhat more detailed schematic illustration of the light transmitter shown in FIG. 1, and FIG. 3 a circuit diagram of the light transmitter which is only schematically illustrated in FIG. 2.

In accordance with FIG. 1 a mother oscillator 43 generate a frequency of for example 10 MHz which is supplied via a phase comparator 44 to a variable oscillator 45 which is connected to a digital phase shifter 46. The one output P' of the digital phase shifter 46 is fed back to the second input of the phase comparator 44, whereby a phase-locked loop is formed as a result of which the variable oscillator transmits a frequency of 300 MHz to the digital phase shifter 46. The frequency adjustment can be executed in such a way that a suitable frequency setting signal is transmitted to the phase comparator 44 at 87 by a microprocessor 16.

The output signal P' of the digital phase shifter 46 is moreover supplied to one input of a mixing stage 47 which mixes this signal additively or multiplicatively to a signal coming from a light receiver 12.

An approximation filter 48 is connected to the output of the mixing stage 47 and is of particular narrow band design. At its output the integral $P \times P'$ appears. P is the light wave train signal transmitted from the digital phase shifter 46 to a light transmitter 11. The pnase setting of the digital phase shifter 46 is effected at 88 by the microprocessor 16.

In the digital phase shifter 46 four phase pairs adjustable in a 90° raster are generated temporally one after the other with a frequency of 75 MHz and are passed on as corresponding wave train signals P and P' to the transmitter 11 or mixer 47.

In the transmitter 11, which is controlled at 89 from the microprocessor 16 with desired brightness values and at 90 with switching signals in a manner which will be described further below, there are provided two laser diodes 18, 19. The laser diodes 18, 19 are switched in a complementary manner to one another by the microprocessor 16 via the connection 89. The one laser diode 18 transmits a high frequency modulated light wave train to a target 13 via a measurement path 14, with the light being reflected by the target back to the receiver 12 arranged directly alongside the light transmitter 11. A single photodiode 20 is arranged in the light receiver and receives both the light from the measurement path 14 and also from a reference path 15 which is accommodated in the same housing 17 as the light transmitter 11 and light receiver 12. Light is sent along the reference path 15 by the second laser diode 19.

In the light receiver 12 there is also located an amplifier, the output signal of which is applied to the mixing stage 47.

The receiving circuit tuning in the receiver 12 is effected at 91 by the microprocessor 16. Furthermore, a control line 92 leads from the light receiver 12 to the microprocessor 16 as a result of which a dynamic evaluation is effected by the latter.

The approximation filter 48 is also energised via a control line 93 from the microprocessor 16 and controlled with respect to its bandwidth.

The output of the approximation filter 48 is applied via an analog-digital circuit 49 to the microprocessor 16 which carries out the signal evaluation in the following manner:

Each of the wave trains which are transmitted by the digital phase shifter 46 and which are respectively displaced phasewise relative to one another by 90° is applied, on the one hand, directly (P') to the one input of the mixing stage 47 and, on the other hand, indirectly (at P) to the other input of the mixing stage 47 via the transmitter 11 and alternately via the measurement path 14 or the reference path 15 and the light receiver 12. In the mixing stage a multiplication of the signal P with the signal P' occurs. Different phase signals appear at the output of the approximation filter as a result of the phase displacement between the light wave trains which have passed via the measurement path 14 and the light wave trains which have passed via the reference path 15. Conclusions can be drawn from these signals concerning the different transit times of the light wave trains via the measurement path 14, on the one hand, and the reference path 15, on the other hand. The differential transit times are evaluated in the microprocessor 16. On taking account of the speed of light the spacing of the housing 17 from the target 13 can be determined.

In accordance with the invention only a single photodiode is provided in the light receiver 12 and is illuminated both via the measurement path 14 and also via the reference path 15.

Figure 2:
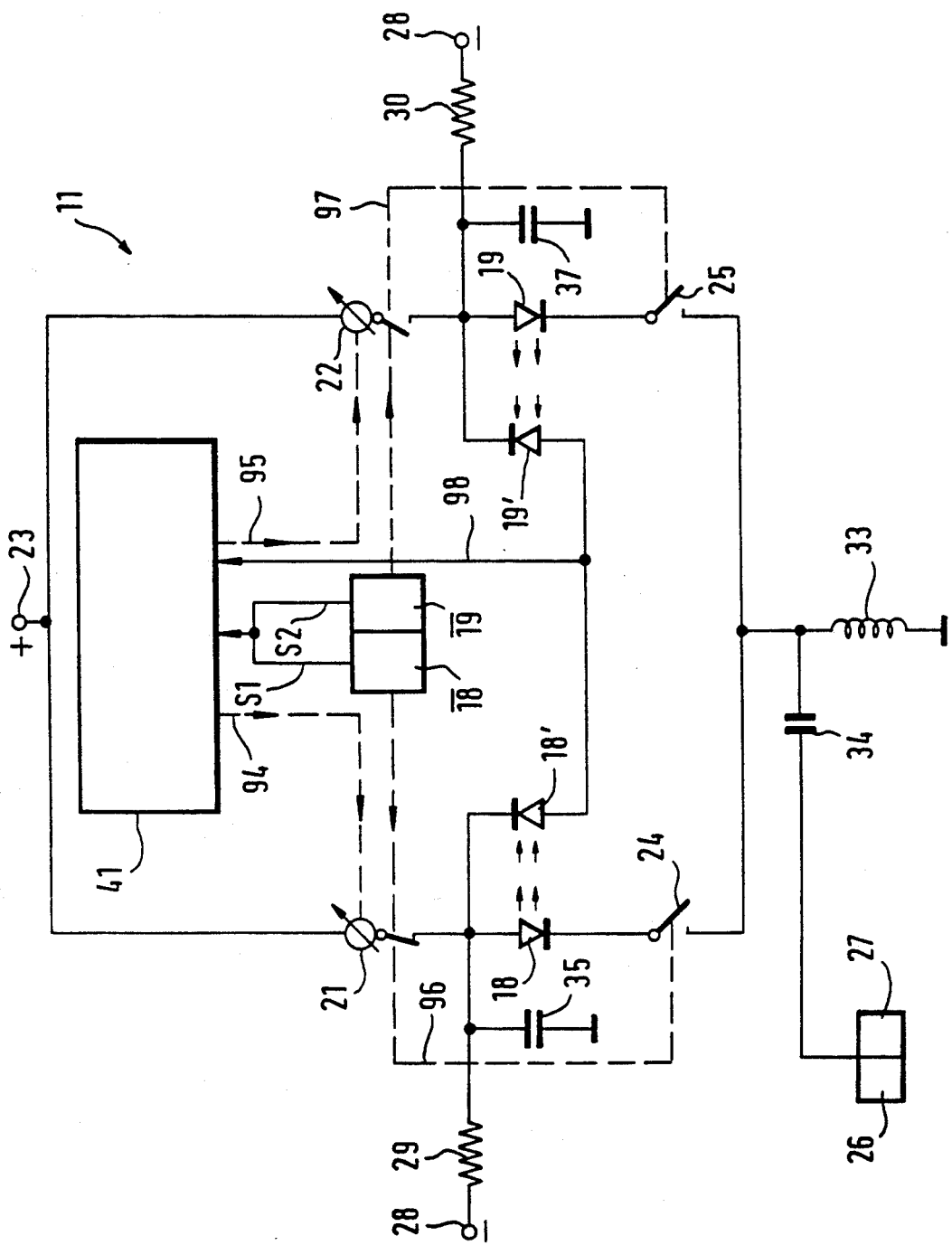

In accordance with FIG. 2 the light transmitter 11 has two laser diodes 18, 19 of which the one supplies the measurement path 14 and the other supplies the reference path 15 with a bundled light beam.

In accordance with FIG. 2 the plus poles of the laser diodes 18, 19 are connected by one auxiliary switch 21, 22, in each case with an associated regulator, at 23 to a positive DC voltage feed source with a potential of, for example, +5.2 V.

The negative poles of the laser diodes 18, 19 are connected via a high frequency switch 24 and 25 respectively to an earthed inductor 33 which forms part of a high pass filter to which a capacitor 34 also belongs. The capacitor 34 is energised by schematically illustrated high frequency modulation voltage terminals 26, 27 to which the wave train signals P (FIG. 1) are supplied.

A negative auxiliary potential of for example −12 V is connected to the positive pole of the laser diodes 18, 19 in each case via a respective high ohm resistor 29 or 30 and a terminal 28.

The auxiliary switches with control 21, 22 are connected in a complementary manner to one another via switching signals applied to the terminal $\overline{18}$ and $\overline{19}$ respectively. When the switch 21 is closed—as shown in FIG. 2—then the other switch 22 is open and vice versa.

A monitoring diode 18' and 19' respectively is associated with each laser diode 18, 19 and the monitoring diodes alternately control a PI regulator 41 to which desired values S1 and S2 are alternatingly supplied by the switching terminals $\overline{18}$ and $\overline{19}$ respectively corresponding to the position of the auxiliary switches 21, 22.

The PI regulator 41 transmits regulation control signals 94, 95 for the regulating part of the switches 21, 22. In this manner the current to the laser diodes 18, 19 can be so regulated that the light intensity of the laser diodes 18, 19 is constant. Provision can furthermore be made via the desired value source S1, S2 that a degradation of the laser diodes 18, 19 is counteracted by a more pronounced opening of the regulator for the switches 21, 22. Preadjustments of specific light intensities are also possible by a change of the desired values S1 and S2.

Capacitors 35, 37 between the positive poles of the laser diodes 18, 19 and earth represent a high pass filter for the high frequency modulation potential supplied via the diode switches 24, 25.

The circuit of FIG. 2 operates as follows:

Switching signals for the switches 21, 22 are supplied via the switching terminal $\overline{18}$, $\overline{19}$ in such a way that the one switch is always closed and the other is always open. The high frequency switches 24, 25 are also closed and opened synchronously therewith, which is illustrated by chain-dotted coupling lines 96, 97. If the switches 21, 24 are closed (see also the left hand representation in FIG. 2) then the associated laser diode 18 lies between the positive feed voltage terminal 23 and earth and is thus switched on. The DC current flowing through the laser diode 18 is simultaneously modulated via the high pass filter 33, 34, 35 with a corresponding high frequency voltage of for example 75 MHz.

After many light wave trains of a suitable length have been transmitted in this manner to the receiver diode 20 (FIG. 1) via the measurement path 14 the switching signal at the switching terminal $\overline{18}$ switches the switch 21, and thus also the switch 24, back into the open position while a complementary switching signal at the switching terminal $\overline{19}$ closes the switch with the regulator 22 and also the high frequency switch 25. The operating cycle at the laser diode 19 now continues in corresponding manner and the light wave trains are transmitted via the reference path 15 (FIG. 1).

Depending on which laser diode (18 or 19) is active the associated monitoring diodes 18' or 19' transmit an actual value signal via a common line 98 to the PI regulator 41. At the same time the switching signals at the switching terminal $\overline{18}$, $\overline{19}$ ensure that the desired value signal S1 or S2 associated with the relevant laser diode 18 or 19 is also passed to the PI regulator. The PI regulator then sets the regulator of the associated switch 21 or 22 accordingly, so that the laser diodes 18, 19 transmit light wave trains with a predetermined intensity.

Figure 3:
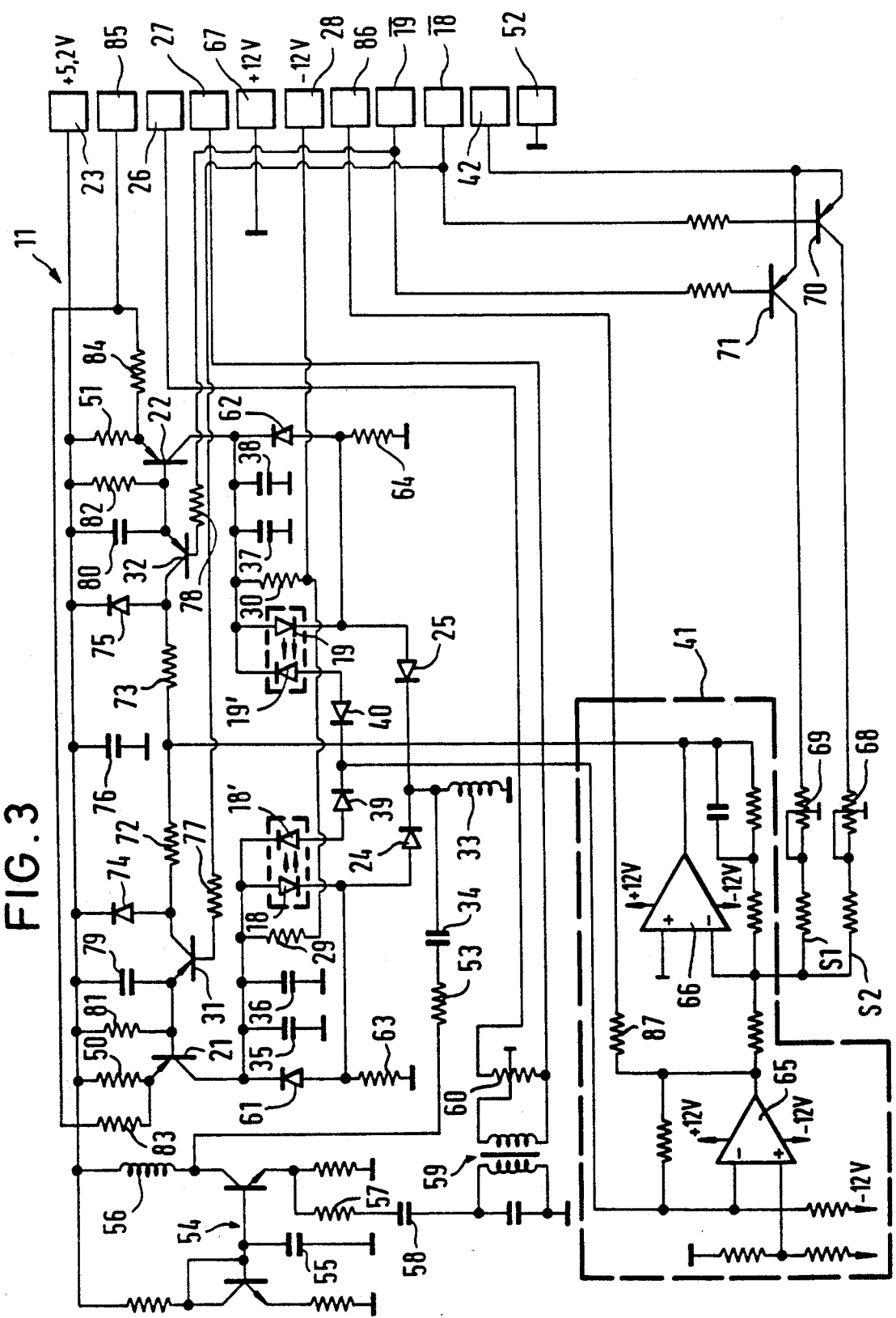

A circuit embodiment which operates in accordance with the block diagram of the principle of FIG. 2 will now be explained in the following with reference to FIG. 3.

The two laser diodes 18, 19 are, on the one hand, connected via respective switching regulating transistors 21 and 22 and resistors 50, 51 inserted into their emitter circuits to the positive DC feed voltage terminal which lies at a potential of +5.2 V. The negative terminals of the laser diodes 18, 19 are, on the other hand connected via respective switching diodes 24 and 25 which each form a high frequency switch and which are connected in the same direction as the laser diodes 18, 19, and via a common inductor 33 to earth, the potential of which is supplied via a terminal 52.

The inductor 33 is a component of a high pass filter which also has a capacitor 34 and which is connected via a resistance 53 to a modulation driver stage 54 which comprises two transistors, connected together by means of their bases, and the associated resistances. The modulation driver stage is likewise connected between earth and the DC feed voltage terminal 23. A capacitor 55 and also an inductor 56 keep the high frequency modulation voltage away from the DC feed line. The output voltage of a transformer 59 is connected to the emitter of the one transistor of the driver stage 54 via a resistor 57 and a capacitor 58. The input winding of the transformer is applied via a potentiometer 60 to the high frequency modulation voltage terminals 26, 27 to which the wave train signals P (FIG. 1) are supplied. The positive feedline to the laser diodes 18, 19 are connected via respective high frequency differentiation capacitors 35, 36 and 37, 38 to earth and are connected via high ohm resistors 29 and 30 respectively to a terminal 28 for the supply of an auxiliary potential of −12 V. The connection points between the laser diodes 18, 19 and the associated switching diodes 24, 25 are likewise connected via respective auxiliary diodes 61 and 62, which are respectively poled opposite to the laser diodes 18, 19, to the positive feedlines of the laser diodes 18, 19. The poles of the auxiliary diodes 61, 62 remote from the transistors 21, 22 are moreover earthed via respective resistors 63, 64.

A monitoring diode 18', 19' is associated with each laser diode 18, 19. The monitoring diodes are connected, on the one hand, to the positive feedline and, on the other hand, via diodes 39, 40 which are poled in the same direction as the diodes 24, 25, jointly to the input of the PI regulator 41. The PI regulator 41 contains two operational amplifiers 65 and 66 respectively which are connected in series. The operating voltages are derived in the illustrated manner from the terminal 28 which lies at −12 V and from a further terminal 67 which lies at +12 V. Two desired signals S1, S2 are alternately supplied to the negative input terminal of the operation amplifier 66 and are derived via respective desired value setting potentiometers 68 and 69, which are connected in parallel, and via respective switching transistors 70 and 71 from a terminal 42 which carries a precise, constant DC voltage. The DC voltage is supplied to the potentiometers 68, 69 via the switching transistors 70, 71 which are opened and closed synchronously with the laser diodes 18, 19 by the switching signals present at $\overline{18}$, $\overline{19}$. In this way, on switching on each of the laser diodes 18 or 19, the desired value S1 or S2 which is provided precisely for the relevant laser diode is supplied to the input of the operational amplifier 66.

The output of the PI regulator 41 is supplied via resistances 72 and 73 to the collectors of respective switching transistors 31 and 32 which are connected via respective diodes 74 and 75 to the positive DC supply potential of +5.2 V in the illustrated manner. The positive DC feedline is earthed via a capacitor 76 for further high frequency decoupling.

The switching voltage for the laser diodes 18, 19 is supplied to the collector of the respective switching transistors 31 and 32, in each case via a respective resistors 77, 78 from the terminals $\overline{18}$ and $\overline{19}$ respectively.

The emitters of the switching transistors 31, 32 are connected via respective capacitors 79 and 80 and respective resistors 81 and 82 to the positive DC voltage terminal 23. Furthermore, the emitters of the transistors 31, 32 are connected to the respective bases of the transistors 21, 22. The emitters of the transistors 21, 22 lie, as already mentioned above, at the positive DC feed voltage of +5.2 V via respective resistors 50 and 51. The collectors of the transistors 21, 22 are connected with the positive feedlines for the respective laser diodes 18 and 19.

A potential is tapped from the emitters of the regulating switching transistors 21 and 22 respectively via resistors 83 and 84 and is supplied to a terminal 85. This signal is representative for the current flowing through the laser diode 18, 19 and can be taken into account in the microprocessor 16 (FIG. 1) for the monitoring of the regulating circuit with respect to the maintenance of the laser protection class or the degradation of the two lasers. For this purpose a further monitoring terminal 86 is provided which is connected via a resistor 87 to the output of the operational amplifier 65 of the PI regulator 41. As this signal is dependent on the light illumination of the monitoring diodes 18', 19' it is representative for the brightness of the laser diodes 18, 19 with a specific applied current, which can in turn be measured at the terminal 85. In this manner the microprocessor 16, to which the terminals 85, 86 are connected, can, for example, detect when the light power weakens for a specific diode current, which can then be taken into account during the evaluation.

The operation of the described circuit is as follows:

Switching on signals for the laser diodes 18 and 19 respectively are alternately transmitted from the microprocessor 16 via the laser diode switching terminals $\overline{18}$ and $\overline{19}$ and open the regulating switching transistors 21, 22 via the switching transistors 31 and 32, and indeed in each case in such a way that at any one time only one of the transistors 21 or 22 is conducting while the other is switched off.

The DC current required for lighting up of the diode is now supplied via the resistor 50 to the laser diode 18, or via the resistor 51 to the laser diode 19, and flows away to earth via the switching diodes 24 or 25 and the inductor 33.

As a result of the negative potential of −12 V supplied to the resistors 29 and 30 respectively, only that switching diode 24, 25 is open for which the laser diode 18 or 19 is supplied with a positive potential via the associated transistor 21 or 22. In this way the current which is drawn from the negative potential through the respective diodes 61 and 62 and the respective resistors 63 and 64, and which would have made the positive pole of the switching transistors 24, 25 negative, is avoided so that the relevant switching diode switches off. The switching diodes 24, 25 thus open and close synchronously with the associated laser diodes 18, 19.

As soon as a laser diode, for example the laser diode 18, is active, the high frequency modulation potential applied at 26, 27 from the high pass filter 33, 34 can now reach the associated laser diode, for example 18, via the now open switching diode, for example 24. The high frequency modulation voltage is led away to earth via the capacitors 35, 36 or 37, 38. In this way the modulation of the laser diodes 18, 19 takes place while they are energised by a DC potential which causes them to light up. The depth of modulation is so large that the diodes extinguish and relight during the modulation in the rhythm of the supplied high frequency modulation potential and can be adjusted at the potentiometer 60.

As a result of the connection of the collectors of the transistors 31, 32 to the output of the PI regulator 41 the degree of opening of the regulating switching transistors 21 and 22 respectively is precisely regulated so that the laser diodes 18 and 19 adopt the light intensity set at the potentiometers 68 and 69 respectively. The regulating switching transistors 21, 22 thus satisfy a double function as setting members of the regulating circuit and also as switches for the switching on and off of the laser diodes 18, 19.

Thus, in accordance with the invention, the switching diodes 24, 25 transmit both the DC laser current and also the superimposed high frequency modulation current. These are high frequency switches since they open during switching off of the associated laser diode 18 or 19 and close again automatically on switching on of the laser diodes 18 and 19.

It is also important that when the laser diodes 18 or 19 respectively are switched off the positive feedlines of the laser diodes are connected via the resistors 29, 30 to a negative auxiliary potential, so that in these periods a potential which completely cuts off the laser diodes is applied to them. In the switched off state of the laser diodes 18 or 19 a potential divider is in each case present, on the one hand, via the resistor 63, the diode 61 and, on the other hand, the resistor 29 and via the resistor 64, the diode 62 and the resistance 30 respectively. The diodes 61, 62 restrict this auxiliary potential to a permissible value. In this way the desired characteristics, namely in particular the lighting up of the laser diodes only in the desired periods is assisted. The brightness of the two laser diodes can be preset by the potentiometers 68 or 69.

The regulation bandwidth of the PI regulator 41 is very much smaller than the modulation frequency.

During each switching on period of one of the laser diodes 18, 19 some thousands of high frequency modulated light wave trains are transmitted via the measurement path 14 and the reference path 15 respectively.

I claim:

1. Distance measuring apparatus comprising a photoelectric light receiver (12) and a photoelectric light transmitter (11) which is arranged alongside the photoelectric light receiver (12), said light transmitter (11) comprising two opto-electronic light transmitting elements (18, 19), which can be electronically switch in a complementary manner, said light transmitting means being fed by an oscillator device (43, 44, 45, 46) and alternately transmitting high frequency modulated light wave trains to the light receiver (12) via a measurement path (14) and a reflective target (13), wherein the distance of the target from the light transmitter (11) to light receiver (12) is to be measured via reference path (15) of known length between the light transmitter (11) and the light receiver (12), within the housing (17) and an electronic evaluation circuit which deduces, from the phase of the alternately received light wave trains, the spacing of the light transmitter (11) to light receiver (12) from the target (13), as the speed of light and the known length of the reference path (15) is considered, characterised in the light receiver (12) containing only one single opto-electronic light receiving element (20), which receives both the light wave trains from the measurement path (14) and also the light wave trains from the reference path (15), said light receiving element being connected to one input of a multiplicatively operating mixing stage (47) belonging to the evaluation circuit, the other input of said mixing stage (47) being supplied with one output wave train signal P' of a digital phase shifter (46) which generates temporally one after the other four phase pairs with modulation frequency, the phase pairs being adjustable in a 90° raster, the other output wave train signal P of the digital phase shifter (46) being supplied to the light transmitter (11), the light wave trains having a wavelength on the order of magnitude of the distance to be measured, the electronic evaluation circuit measuring the phase difference of the modulation of the light wave trains which have passed along the measurement path (14) and the light wave trains which have passed along the reference path (15) by connecting an approximation filter (48) with a particular narrow band design to the output of the mixing stage (47), the approximation filter (48) forming the integral ($P \times P'$) of the two wave train signals (P, P'). and the signal occurring at the output of the approximation filter (48) being evaluated in a microprocessor (16) belonging to the evaluation circuit for obtaining the difference of the transit times of the light wave trains via the measurement path (14), on the one hand and the transmit time via the reference path (15), on the other hand.

2. Distance measuring apparatus in accordance with claim 1, wherein said light transmitting elements are laser diodes and characterised in that the laser diodes (18, 19) has a positive feed line and a negative feed line and can be connected to auxiliary switches (21, 22) which can be switched in a complementary manner to the positive feed line (23) and can be connected to the high frequency modulation voltage (26, 27) via high frequency switches (24, 25) which can be switched in a complementary manner, in synchrony with the auxiliary switches (21, 22).

3. Distance measuring apparatus in accordance with claim 2, characterised in that a monitoring diode (18'; 19') is associated with each laser diode (18, 19) and is integrated therewith, with the monitoring diode being connected via a diode (39, 40) poled in the same direction as the switching diodes (24, 25) to the input of a PI-regulator (41), which regulates the laser diodes (18, 19) to a predetermined intensity value via the switching regulating transistors (21, 22; 31, 32).

4. Distance measuring apparatus in accordance with claim 3, characterised in that a desired value signal which takes account of the degradation of the laser diodes (18; 19), or which serves for the adjustment of the laser diode brightness, is also supplied to the PI regulator (41); and indeed in that a special desired value signal (S1, S2) is provided for each laser diode (18, 19).

5. Distance measuring apparatus in accordance with claim 2, characterised in that a negative potential (28) is applied to the respectively switched off laser diode (18; 19).

6. Distance measuring apparatus in accordance with claim 5, characterised in that the positive terminal of each laser diode (18; 19) is connected to a preferably negative DC blocking potential (28) via a resistance (29; 30) which is of a higher order of magnitude than the resistance value of the through switched laser diode (18; 19).

7. Distance measuring apparatus in accordance with claim 2, characterised in that the positive terminal of each laser diode (18; 19) is connected to the positive feed voltage (23) via a respective transistor (21, 22) which forms the auxiliary switch.

8. Distance measuring apparatus in accordance with claim 7, characterised in that the transistor (21; 22) is energised both by a switching signal ($\overline{18}$, $\overline{19}$), and also by a regulating signal for maintaining a predetermined light intensity and also for regulating out degradations of the laser.

9. Distance measuring apparatus in accordance with claim 8, characterised in that a switching transistor (31; 32) which is preferably acted on at its base by the switching signal ($\overline{18}$, $\overline{19}$) and acted on at its collector by the regulating signal is connected in front of the combined switching-regulating transistor (21; 22).

10. Distance measuring apparatus in accordance with claim 2, characterised in that switching diodes (24; 25) which are poled in the same direction as the laser diodes (18; 19) are inserted into the negative feedline to the laser diodes (18; 19) as high frequency switches and are jointly connected via the inductor (33) of a high pass filter (33, 34) energised by the high frequency modulation potential (26, 27) to the negative pole of the feed voltage or to earth.

11. Distance measuring apparatus in accordance with claim 10, characterised in that the connection point of each switching diode (24; 25) with the laser diode (18; 19) lies at a negative potential (28) when the laser diode (18; 19) is switched off.

12. Distance measuring apparatus in accordance with claim 11, characterised in that high frequency decoupling capacitors (35, 36, 37, 38) are inserted between the positive feedline to the laser diodes (18, 19) and the negative pole of the feed voltage or earth.

13. Distance measuring apparatus in accordance with claim 2, characterised in that the auxiliary switches (21, 22) are inserted into the positive feed lines and the high frequency switches (24, 25) are inserted into the negative feedlines to the laser diodes (18; 19).

* * * * *